United States Patent
Thaler

(10) Patent No.: US 7,503,956 B2
(45) Date of Patent: Mar. 17, 2009

(54) EXHAUST TREATMENT DEVICE WITH ADJUSTABLE RETENTION COLLAR

(75) Inventor: David M. Thaler, Mossville, IL (US)

(73) Assignee: Caterpillar Inc., Peoria, IL (US)

( * ) Notice: Subject to any disclaimer, the term of this patent is extended or adjusted under 35 U.S.C. 154(b) by 502 days.

(21) Appl. No.: 11/257,863

(22) Filed: Oct. 25, 2005

(65) Prior Publication Data

US 2007/0089388 A1    Apr. 26, 2007

(51) Int. Cl.
*B01D 46/00* (2006.01)

(52) U.S. Cl. .................. 55/523; 55/385.3; 55/498; 55/502; 55/503; 55/524; 55/DIG. 5; 55/DIG. 10; 55/DIG. 30; 95/273; 60/297; 60/299; 60/311; 422/180

(58) Field of Classification Search .............. 55/495, 55/498, 502, 503, 523, 524, DIG. 5, DIG. 10, 55/DIG. 30, 385.3; 95/273; 60/274, 275, 60/295, 297, 299, 300, 303, 311; 422/177, 422/179, 180; 210/435, 450, 455
See application file for complete search history.

(56) References Cited

U.S. PATENT DOCUMENTS

| 3,633,343 | A | * | 1/1972 | Mark ......................... 55/323 |
| 3,675,398 | A | * | 7/1972 | Giarrizzo ..................... 55/524 |
| 3,854,888 | A | * | 12/1974 | Frietzsche et al. ............ 422/180 |
| 4,093,423 | A | * | 6/1978 | Neumann ..................... 422/180 |
| 4,209,494 | A | * | 6/1980 | Oya et al. .................... 422/180 |
| 4,282,186 | A | * | 8/1981 | Nonnenmann et al. ...... 422/180 |
| 4,504,294 | A | * | 3/1985 | Brighton ....................... 55/523 |
| 4,557,682 | A | | 12/1985 | Montierth |
| 4,612,260 | A | | 9/1986 | Kumagai et al. |
| 4,715,576 | A | | 12/1987 | Montierth |
| 4,752,516 | A | | 6/1988 | Montierth |
| 4,759,892 | A | | 7/1988 | Bonzo |
| 5,051,294 | A | * | 9/1991 | Lunkas et al. ............... 422/180 |
| 6,101,714 | A | * | 8/2000 | Schmitt ........................ 29/890 |
| 6,537,355 | B2 | * | 3/2003 | Scardino et al. ............... 55/502 |
| 6,613,295 | B1 | | 9/2003 | Kageyama et al. |
| 6,726,218 | B2 | | 4/2004 | Negishi et al. |
| 6,726,884 | B1 | | 4/2004 | Dillon et al. |
| 6,737,027 | B1 | | 5/2004 | Myers |
| 6,923,942 | B1 | | 8/2005 | Shirk et al. |
| 7,048,896 | B2 | * | 5/2006 | Nagel et al. ................. 422/180 |
| 2004/0191132 | A1 | | 9/2004 | DeSousa et al. |

* cited by examiner

*Primary Examiner*—Jason M Greene
(74) *Attorney, Agent, or Firm*—Finnegan, Henderson, Farabow, Garrett & Dunner

(57) ABSTRACT

A method and apparatus for treating fluid are provided. The apparatus may include a housing, a fluid treatment element arranged within the housing, a mat arranged between the housing and the fluid treatment element, and a collar. The collar may have a curved length terminating at first and second ends and may be arranged within the housing proximate the fluid treatment element.

20 Claims, 4 Drawing Sheets

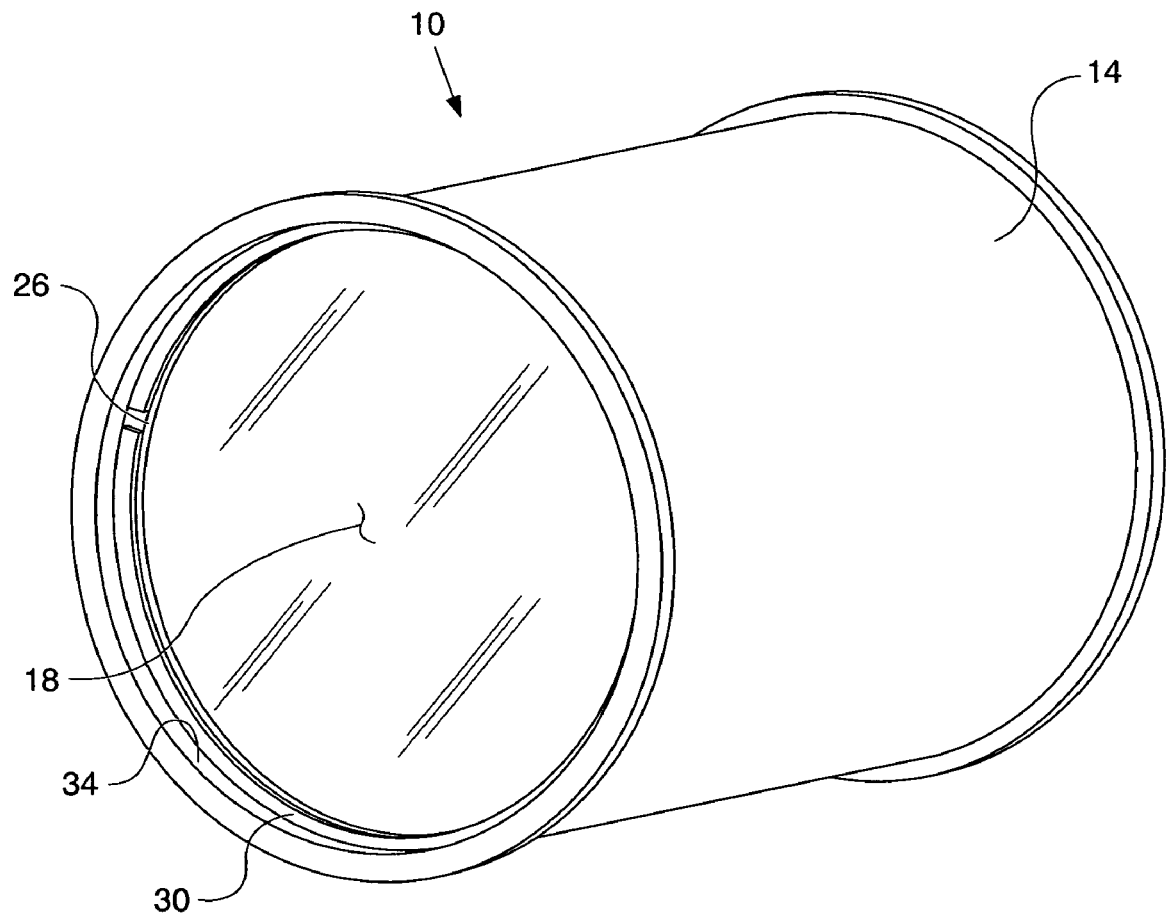

Fig_3a_
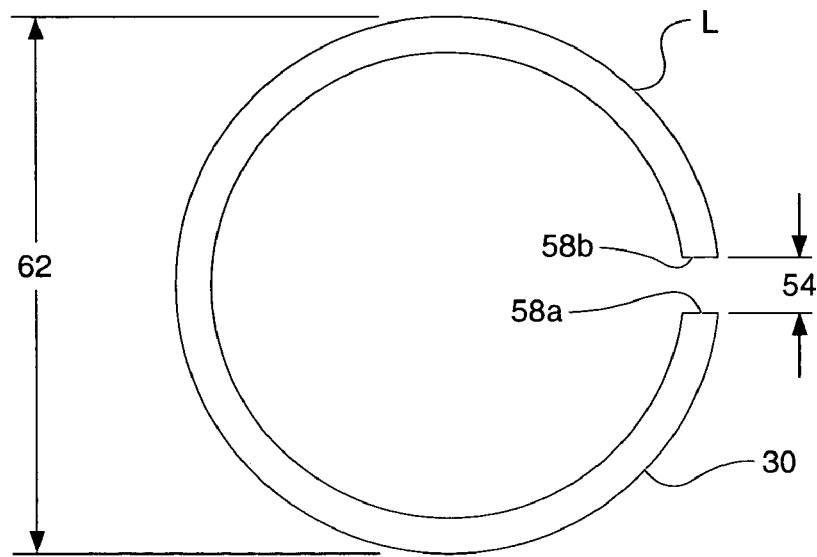
Fig_3b_
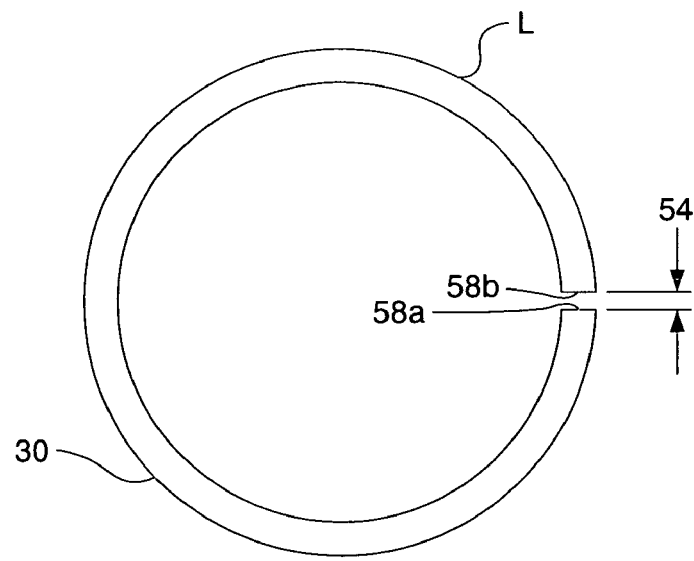

EXHAUST TREATMENT DEVICE WITH ADJUSTABLE RETENTION COLLAR

TECHNICAL FIELD

This disclosure relates generally to a method and apparatus for treating gases and, more particularly, to a method and apparatus for treating exhaust gases from an engine.

BACKGROUND

A diesel particulate filter (DPF) is a gas treatment device that is commonly arranged within an exhaust gas stream of an internal combustion engine to trap particulates present in the exhaust gas. A DPF may include a cylindrical metal housing wrapped around a cylindrical ceramic filter element. A resilient mat may be compressed between the outer wall of the filter element and the inner wall of the metal housing. Because the mat is resilient and compressed around the filter element by the housing wall, the mat may help secure the filter element within the housing while reducing vibratory effects between the housing and the filter. Typically, a pliable annular retention gasket and a rigid annular retention ring are secured within the housing at each axial end of the filter to further secure the filter element within the housing.

During a DPF assembly process (the "canning" process), a resilient mat may be wrapped around a ceramic filter. Then a sheet metal housing shell may be tightly wrapped around the mat and the filter to compress the mat against the filter. When a desired dimensional relationship is achieved between the shell, the mat, and the filter, the shell may be welded closed. A pliable annular retention gasket may be placed at each axial end of the filter, and a rigid annular retention ring may be secured within the housing adjacent each retention gasket.

There are at least two methods for creating a desired dimensional relationship between the shell, the mat, and the filter during the canning process. The first method may be referred to as a "can-to-size" method, during which a sheet metal shell is wrapped in a tubular shape around the filter and the mat until the metal shell reaches a target diameter. After a target diameter is reached, the shell is welded closed. The can-to-size method ensures a desired shell diameter is accomplished. Thus, single-size retention gaskets and rings may typically be used within the housing when a can-to-size method is used. However, since the diameter of a filter element and the initial thickness of a resilient mat may vary due to common part-to-part dimensional supply variation, the can-to-size method may inconsistently compress a mat around a filter element. For example, if a manufacturer uses mats with a supply variation of +/−1 mm diameter and filters with a supply variation of +/−2 mm diameter, the diameter of a mat-filter assembly could vary by as much as 8 mm. Since the can-to-size method produces housings having the same diameter, it should be appreciated that mat-filter assemblies with smaller diameters (due to supply variations) may cause mats to be compressed within the housings less than mat-filter assemblies having larger diameters. Thus, multiple DPF's produced using the same can-to-size method may exhibit inconsistent mat compression values. Moreover, the more a mat is compressed around a filter, the more axial force the filter can withstand before being dislodged from the grip of a shell and mat. Therefore, dimensional variations in supply mats and filters may result in varying degrees of "holding forces" being exerted on filters in DPF's assembled using a can-to-size method.

A second method for determining a desired relationship between the shell, the mat, and the filter during a canning process is the "can-to-force" method. During this method, a sheet metal shell is wrapped in a tubular shape around the filter and the mat until the mat is compressed a target amount between the filter and the metal shell. The can-to-force method ensures that a desired holding force is exerted by the housing and mat on the filter. However, since the diameter of a filter element and the initial thickness of a resilient mat may vary due to common part-to-part dimensional supply variation, the can-to-force method may produce inconsistent housing diameters. Thus, different size retention rings may be used within different housings to accommodate the varying housing diameters produced with a can-to-force assembly method.

Some manufacturers may consider using a can-to-size assembly process with over-sized mats so that variations in holding force resulting from varying component dimensions are less significant. Other manufacturers may consider using a can-to-force assembly process while stocking differently-sized retention rings.

Prior assembly processes may be improved, for example, by permitting use of optimally sized mats and filters while reducing component stocking requirements.

The present invention is directed to overcome or improve one or more disadvantages associated with prior apparatus and methods for treating gases.

SUMMARY OF THE INVENTION

In one aspect of the present invention, a method of assembling a fluid treatment device for treating fluid is provided. The method may include arranging a mat between a housing and a fluid treatment element, and positioning a variable diameter collar within the housing so that the diameter of the collar achieves a desired dimensional relationship relative the housing.

In another aspect of the present invention, a fluid treatment device for treating fluid is provided. The device may include a housing, a fluid treatment element arranged within the housing, a mat arranged between the housing and the fluid treatment element, and a collar. The collar may have a curved length terminating at first and second ends and may be arranged within the housing.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments or features of the invention and, together with the description, serve to explain the principles of the invention. In the drawings, FIG. 1 is a perspective view of a fluid treatment device;

FIG. 3A is a side view of a collar having a first gap value;

FIG. 3B is a side view of a collar having a second gap value;

Although the drawings depict exemplary embodiments or features of the present invention, the drawings are not necessarily to scale, and certain features may be exaggerated in order to better illustrate and explain the present invention.

The exemplifications set out herein illustrate exemplary embodiments or features of the invention and such exemplifications are not to be construed as limiting the scope of the invention in any manner.

DETAILED DESCRIPTION

Reference will now be made in detail to embodiments or features of the invention, examples of which are illustrated in the accompanying drawings. Wherever possible, the same or corresponding reference numbers will be used throughout the drawings to refer to the same or corresponding parts.

Figure 2:
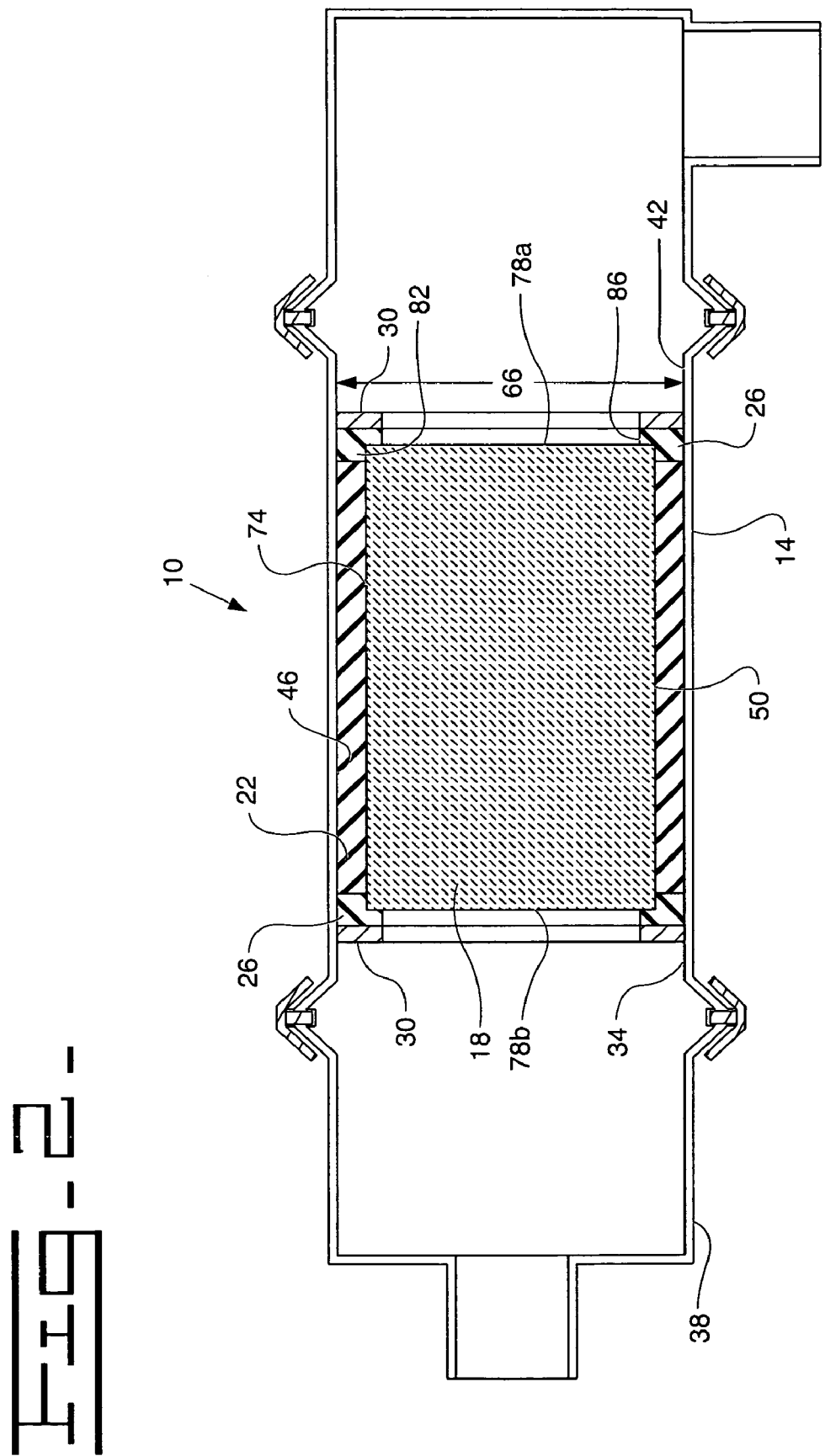
FIG. 2 is a front cross-sectional view of the fluid treatment device of FIG. 1 connected with an exhaust stream.

Referring now to FIGS. 1 and 2, a fluid treatment device 10 for treating fluid is shown. More particularly, FIGS. 1 and 2 show a diesel particular filter (DPF) 10 for treating exhaust gas from an engine. The DPF 10 may include a housing 14, a fluid treatment element 18 arranged within the housing 14, a mat 22 arranged between the housing 14 and the fluid treatment element 18, one or more gasket elements 26, and one or more collars 30.

The housing 14 may form a metallic shell for the DPF 10 for directing a stream of engine exhaust gas from an exhaust pipe 38 into an exhaust inlet 34, through the fluid treatment element 18, and out of the DPF 10 through an exhaust outlet 42. The housing 14 may be formed into a generally cylindrical, shape and may be made from a suitable metallic material, such as steel, for handling hot exhaust gases.

The fluid treatment element 18 may be an exhaust treatment element 18, such as a cylindrical ceramic substrate, for treating exhaust gas from an engine. For example, as discussed earlier, a ceramic substrate 18 may be used to remove particulates from a stream of engine exhaust gas.

A mat 22 may be arranged between the housing 14 and the fluid treatment element 18. For example, the mat 22 may be formed from a resilient material and may be compressed to a predetermined amount between an inner surface 46 of the housing 14 and an outer surface 50 of the fluid treatment element 18. The mat 22 may take the form of a single piece of material covering a substantial portion of the outer surface 50 of the fluid treatment 18 (as shown in FIG. 1). However, it should be appreciated that, alternatively, the mat may take other forms, such as one or more relatively smaller strips of material, each covering a relatively small portion of the outer surface 50 of the fluid treatment element 18. The mat 22 may be formed from an intumescent material, a non-intumescent material, or a combination material having intumescent and non-intumescent properties, and may also function as a heat insulator between the fluid treatment element 18 and the housing 14. In one embodiment, the mat 22 may be formed at least in part from alumina-silicate cloth.

A gasket element 26 may be arranged at each end of the fluid treatment element 18 inside the housing 14. The gasket elements 26 may be pliable annular gaskets, such as metal wire mesh gaskets, for providing longitudinal support to and further stabilizing the fluid treatment element 18 inside the housing 14. The gasket elements 26 may also protect the mat 22 from being overly exposed to exhaust gases within the housing 14.

Figure 4:
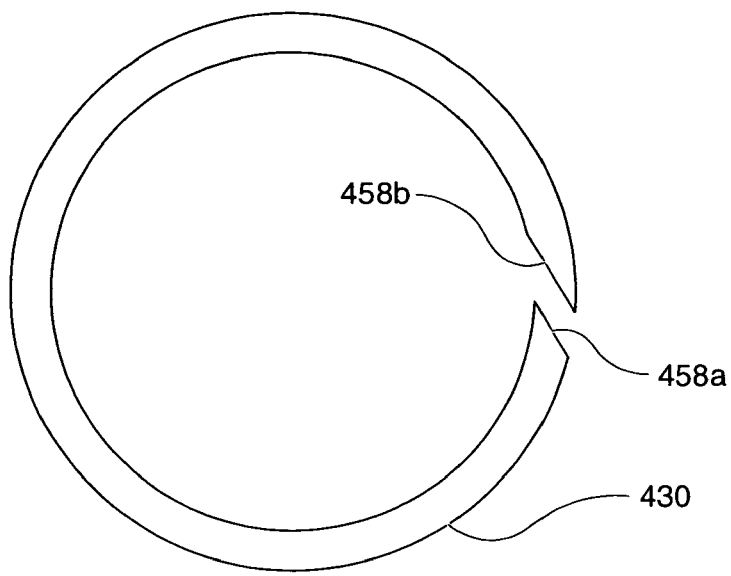
FIG. 4 is a side view of an alternative embodiment of a collar.
Figure 5:
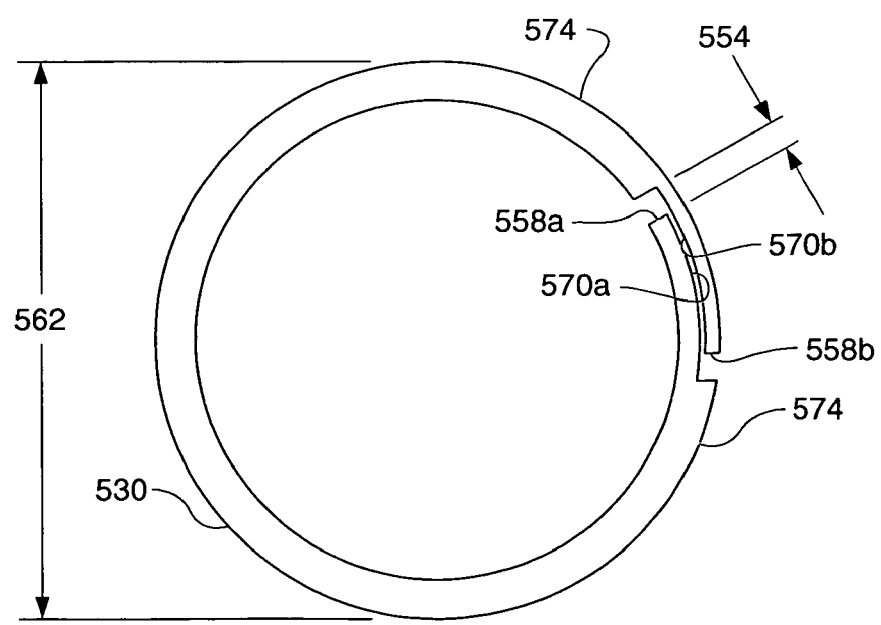
FIG. 5 is a side view of a further alternative embodiment of a collar.

The gasket elements 26 may be held firmly against the sides of the fluid treatment element 18 via collars 30, which may be arranged inside the housing 14 proximate the exhaust treatment element 18. Referring now to FIGS. 3A and 3B, each collar 30 may be formed as an annular ring with a gap 54 therein. For example, each collar may have a curved length L that terminates at first and second ends 58a, 58b. The first and second ends 58a, 58b may be movable relative each other. As illustrated in FIGS. 3A, 3B, and 4, the first and second ends 58a, 58b and 458a, 458b may be configured with generally flat ends that are transverse at 90 degrees (FIGS. 3A, 3B) to the length of the collar 30 or may be configured with generally flat ends that are angled at less or more than 90 degrees (FIG. 4) to the length of the collar 30. As illustrated in FIG. 5, each of the first and second ends 558a, 558b may be configured to overlap the other and may include a notched portion 570a therein for receiving a mating notched portion 570b from the opposing end. The notched portion 570a may include a length of collar having a lesser width than an adjacent portion 574 of the collar 350.

As shown in FIGS. 2 and 3, each collar 30 may be positioned within the housing 14 so that an outer diameter 62 of the collar 30 generally conforms to an inner diameter 66 of the housing 14. The collars 30 may be formed from a variety of materials, such as stainless steel. In one embodiment, the collars 30 may be formed from the same type of material as the housing 14 so that the thermal expansion characteristics of the collar 30 correspond with those of the housing 14.

As best seen in FIGS. 3A and 3B, a single collar 30 may be formed with an original predetermined gap 54 value. During installation of the collar 30 into the housing 14, the gap 54 value may be reduced to facilitate insertion of the collar 30 into the housing 14. After insertion, the collar 30 may be allowed to expand toward its original gap 54 value until it meets, and perhaps tightly engages, the internal wall 46 of the housing 14.

INDUSTRIAL APPLICABILITY

In an assembly operation, a mat 22 may be applied to an outer surface 50 of a fluid treatment element 18. A housing 14 may be applied about the mat 22 and the fluid treatment element 18 so that the mat 22 is arranged between an inner wall 46 of the housing 14 and an outer surface 74 of the fluid treatment element 18. Arrangement of the housing 14 relative the mat 22 and fluid treatment element 18 may be adjusted so that the mat 22 is compressed a predetermined amount between the housing 14 and the fluid treatment element 18. For example, the diameter 66 of the housing 14 may be reduced until a desired mat compression characteristic (e.g., a compression amount) is accomplished. One skilled in the art will appreciate that the desired compression characteristic may vary depending on desired holding force, among other things. Once the desired compression characteristic is accomplished, the housing may be closed, for example via a welding process.

First and second gasket elements 26 may be arranged within the housing 14 adjacent longitudinal ends 78a, 78b of the fluid treatment element 18.

As indicated in FIG. 2, the gasket elements 26 may be arranged so that a portion 82 of each gasket 26 is arranged between an outer surface 74 of the fluid treatment element 18 and the housing inner wall 46 and may extend toward and into contact with the mat 22. Moreover, a portion 86 of each gasket 26 may be configured to extend radially over an end surface 78a, 78b of the fluid treatment element 18. Thus, the gaskets 26 may be configured within the housing 14 to provide additional support for the fluid treatment 18 relative the housing 14 while also protecting the mat 22 from exhaust gas.

A collar 30 having an original, or initial, gap 54 value may be compressed so that the gap 54 value and collar outer diameter 62 are reduced from the original values. Then collar 30 may be inserted into the housing 14 and placed into a desired position, for example adjacent a gasket 26 and the fluid treatment element 18. The collar 30 may then be expanded (for example under its own resilience) so that the gap 54 value and gasket diameter 62 are increased again until the outer diameter of the collar 30 achieves a desired dimensional relationship relative the housing, for example until the outer surface of the collar 30 engages, and perhaps tightly, the inner surface of the housing 14. In the embodiment of FIGS. 1 and 2, an outer diametrical contour of the collar 30 is shown in conforming engagement with an inner diametrical contour of the housing 14. When the collar 30 is arranged as desired, the collar 30 may be secured relative the housing, for example via a welding process, so that the adjacent gasket 26 is held securely in a desired abutting position relative the fluid treatment element 18 and the mat 22. The collar 30 may be positioned so that the gasket 26 is compressed a desired amount between the collar 30 and the fluid treatment element 18 and/or the mat 22. A similar insertion, arrangement, and securing process may occur with the second collar 30 arranged proximate an opposite axial end of the fluid treatment element 18.

In one embodiment (FIG. 5), overlapping end portions 570a, 570b may be moved relative each other during the compression and expansion of the collar 530 as may occur during insertion and positioning of the collar 530 within the housing 514. Once the collar 530 is arranged as desired, the opposing end portions 570a, 570b may be secured together, for example during a welding process, to fix the gap 554 value and outer diameter 562 of the collar 530.

Based on the foregoing description, it should be appreciated that the collar 30 may be configured in a pre-installed state with an original (i.e., free or unsprung) diameter 62 and gap 54 value to accommodate the largest expected housing diameter to which the collar 30 would be applied. Moreover, the collar 30 may be configured such that, when installed in housings 14 having a predetermined range of inner diameters 66, the collar 30 will have predetermined minimum or maximum gap 54 values or minimum or maximum outer diameters 62. For example, a collar 30 may be configured so that when it is installed into a housing 14 having a minimum desired inner diameter 66, the gap 54 value is at or nearly zero, or the outer diameter 62 of the collar 30 has a desired minimum value. Conversely, the collar 30 may be configured so that when it is installed into a housing 14 having a maximum desired inner diameter 66, the gap 54 value is a predetermined maximum value, or the outer diameter 62 has a desired maximum value.

It should be appreciated that the present disclosure provides a method and apparatus for treating gases. Some of the advantages of disclosed embodiments may include the provision of an apparatus employing a variable diameter collar 30 that may permit either a can-to-size or a can-to-force assembly process while eliminating or reducing variation in collar 30 stocking or inventory requirements. For example, a single collar 30 as disclosed herein may fit housings 14 having a range of inner diameters 66.

From the foregoing it will be appreciated that, although specific embodiments of the invention have been described herein for purposes of illustration, various modifications may be made without deviating from the spirit or scope of the invention. Other embodiments of the invention will be apparent to those skilled in the art from consideration of the specification and figures and practice of the invention disclosed herein. It is intended that the specification and disclosed examples be considered as exemplary only, with a true scope and spirit of the invention being indicated by the following claims and their equivalents. Accordingly, the invention is not limited except as by the appended claims.

What is claimed is:

1. A method of assembling a fluid treatment device for treating fluid, the method comprising:
    arranging a mat between a housing and a fluid treatment element;
    positioning a variable diameter collar within the housing so that the diameter of the collar achieves a desired dimensional relationship relative the housing, and
    moving longitudinal ends of the collar relative to each other to adjust the diameter of the collar.

2. The method of claim 1, wherein the step of moving longitudinal ends of the collar relative to each other includes moving overlapping ends of the collar relative to each other.

3. The method of claim 1, including affixing the variable diameter collar to the housing after the collar diameter has been adjusted.

4. The method of claim 1, wherein:
    the step of positioning the variable diameter collar within the housing further includes arranging the collar within the housing so that an outer diameter of the collar generally conforms to an inner diameter of the housing.

5. The method of claim 1, wherein the mat is a resilient mat.

6. The method of claim 5, wherein:
    the step of arranging the resilient mat between a housing and a fluid treatment element includes adjusting the size of the housing so that the mat is compressed a predetermined amount between the housing and the fluid treatment element.

7. The method of claim 1, including:
    positioning a gasket element within the housing adjacent the fluid treatment element;
    wherein the step of positioning the variable diameter collar within the housing includes positioning the collar in abutment with the gasket element so that the gasket element is held in engagement with the fluid treatment element.

8. The method of claim 1, including:
    the step of positioning the variable diameter collar within the housing includes positioning the collar proximate a first end of the fluid treatment element; and
    the method includes positioning a second variable diameter collar within the housing proximate a second end of the fluid treatment element so that the diameter of the second collar achieves a desired dimensional relationship relative the housing.

9. The method of claim 1, wherein the step of positioning the variable diameter collar within the housing includes:
    compressing the collar to a reduced diameter;
    then permitting the collar to expand within the housing to a desired diameter.

10. The method of claim 1, wherein the fluid treatment element is an exhaust treatment element for treating exhaust gas from an engine.

11. The method of claim 10, wherein the exhaust treatment element is a particulate filter.

12. A fluid treatment device for treating fluid, comprising:
    a housing;
    a fluid treatment element arranged within the housing;
    a mat arranged between the housing and the fluid treatment element; and
    a collar having a curved length terminating at first and second ends and being arranged within the housing,
    wherein the first and second ends of the collar overlap each other, and
    wherein the first and second ends move relative to each other when the collar is arranged within the housing.

13. The fluid treatment device of claim 12, including:
a gasket element positioned within the housing between the fluid treatment element and the collar.

14. The fluid treatment device of claim 12, wherein the collar has an outer diameter that generally conforms to an inner diameter of the housing.

15. The fluid treatment device of claim 12, wherein the mat is a resilient mat.

16. The fluid treatment device of claim 15, wherein the mat is compressed to a predetermined amount between the housing and the fluid treatment element.

17. The fluid treatment device of claim 12, wherein:
the collar is a first collar arranged proximate a first end of the fluid treatment element;
the fluid treatment device includes a second collar having a curved length terminating at first and second ends and being arranged within the housing proximate a second end of the fluid treatment element.

18. The fluid treatment device of claim 12, wherein:
the fluid treatment device is an exhaust treatment device for treating exhaust gas from an engine.

19. The fluid treatment device of claim 18, wherein: the exhaust treatment device is a particulate filter.

20. The method of claim 9, wherein the reduced diameter is a predetermined diameter.

\* \* \* \* \*